United States Patent
Schuetz

(10) Patent No.: US 11,157,470 B2
(45) Date of Patent: Oct. 26, 2021

(54) METHOD AND SYSTEM FOR DATA QUALITY DELTA ANALYSIS ON A DATASET

(71) Applicant: International Business Machines Corporation, Armonk, NY (US)

(72) Inventor: Werner Schuetz, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/429,610

(22) Filed: Jun. 3, 2019

(65) Prior Publication Data
US 2020/0379961 A1 Dec. 3, 2020

(51) Int. Cl.
*G06F 16/215* (2019.01)
*G06F 16/23* (2019.01)

(52) U.S. Cl.
CPC ........ *G06F 16/215* (2019.01); *G06F 16/2379* (2019.01)

(58) Field of Classification Search
USPC ................................................ 707/748, 625
See application file for complete search history.

(56) References Cited

U.S. PATENT DOCUMENTS

| | | | |
|---|---|---|---|
| 8,892,534 B2 | 11/2014 | Hamlescher | |
| 8,935,721 B2 * | 1/2015 | Tidwell | G06Q 30/0244 725/34 |
| 9,092,468 B2 | 7/2015 | Nelke | |
| 9,703,823 B2 | 7/2017 | Daly | |
| 10,127,264 B1 * | 11/2018 | Pyle | G06F 16/2365 |
| 2005/0125422 A1 * | 6/2005 | Hirst | G06N 5/04 |
| 2008/0140602 A1 * | 6/2008 | Roth | G06F 16/215 706/59 |
| 2012/0078410 A1 * | 3/2012 | Wong | G06Q 10/06395 700/110 |
| 2013/0006931 A1 * | 1/2013 | Nelke | G06Q 10/10 707/625 |
| 2013/0031044 A1 * | 1/2013 | Miranda | G06N 5/025 706/47 |
| 2014/0207792 A1 * | 7/2014 | Carasso | G06F 40/211 707/748 |
| 2015/0006491 A1 * | 1/2015 | He | G06F 16/27 707/694 |
| 2016/0098654 A1 | 4/2016 | Bhattacharjee | |

(Continued)

OTHER PUBLICATIONS

"Data quality methodology," IBM Knowledge Center, printed Sep. 12, 2018, 4 pages, <https://www.ibm.com/support/knowledgecenter/en/SSZJPZ_8.7.0/com.IBM.swg.im.iis.ia.application.doc/topics/dq_method.html>.

(Continued)

*Primary Examiner* — Cam Linh T Nguyen
(74) *Attorney, Agent, or Firm* — Scott S. Dobson

(57) ABSTRACT

The present disclosure relates to a method for data quality delta analysis on a dataset. The method provides a set of data quality rules for the dataset. At least one delta rule of a set of data quality rules is defined as relevant for delta analysis of at least part of the dataset, the delta rule being a delta analysis quality rule. Data changes on the dataset are tracked. In response to determining that a number of modified records of the at least part of the dataset is higher than a predefined insert modification threshold, a data quality score may be determined for said modified records using the delta rule.

20 Claims, 8 Drawing Sheets

(56) References Cited

U.S. PATENT DOCUMENTS

| | | | |
|---|---|---|---|
| 2016/0267082 A1* | 9/2016 | Wong | G06F 16/164 |
| 2016/0364434 A1* | 12/2016 | Spitz | G06F 16/2365 |
| 2017/0017705 A1 | 1/2017 | Nelke | |
| 2017/0103101 A1* | 4/2017 | Mason | G06F 16/215 |
| 2017/0190171 A1* | 7/2017 | Sponer | B41J 2/04581 |
| 2017/0279579 A1* | 9/2017 | Qian | H04W 72/0406 |
| 2018/0105858 A1* | 4/2018 | Nakazono | C12Q 1/06 |
| 2018/0173733 A1* | 6/2018 | Nath | G06N 5/025 |
| 2018/0246912 A1 | 8/2018 | Arning | |
| 2020/0116887 A1* | 4/2020 | Vinay | G01V 3/30 |
| 2020/0201906 A1* | 6/2020 | Muzik | G06N 5/022 |
| 2020/0286025 A1* | 9/2020 | Ramchandran | G06N 5/046 |
| 2020/0350032 A1* | 11/2020 | Saillet | G06F 3/0659 |

OTHER PUBLICATIONS

Batini et al., "Methodologies for Data Quality Assessment and Improvement," ACM Computing Surveys, vol. 41, No. 3, Article 16, Jul. 2009, pp. 1-52. <https://dl.acm.org/citation.cfm?id=1541883>.

* cited by examiner

METHOD AND SYSTEM FOR DATA QUALITY DELTA ANALYSIS ON A DATASET

BACKGROUND

The present disclosure relates to the field of digital computer systems, and more specifically, to a method for data quality delta analysis on a dataset.

Controlling database systems based on quality rules may be beneficial, in particular as the quality of datasets can impact the performance of a database system. However, for large databases the control of the quality may be resource consuming.

SUMMARY

Various embodiments provide a method for data quality delta analysis on a dataset, computer system and computer program product as described by the subject matter of the independent claims. Advantageous embodiments are described in the dependent claims. Embodiments of the present invention can be freely combined with each other if they are not mutually exclusive In one aspect, the disclosure relates to a computer-implemented method for data quality delta analysis on a dataset. The method comprises: providing a set of data quality rules for the dataset; defining at least one delta rule of the set of data quality rules as relevant for delta analysis of at least part of the dataset, the delta rule being a delta analysis quality rule; tracking data changes on the dataset; in response to determining that a number of modified records of the at least part of the dataset is higher than a predefined insert modification threshold, determining a data quality score for said modified records using the delta rule.

In another aspect, the disclosure relates to a computer program product comprising a computer-readable storage medium having computer-readable program code embodied therewith, the computer-readable program code configured to implement all of steps of the method according to preceding embodiments.

In another aspect, the disclosure relates to a system for data quality delta analysis on a dataset. The system comprises one or more processors; and a memory communicatively coupled to the one or more processors, wherein the memory comprises instructions which, when executed by the one or more processors, cause the one or more processors to perform a method. The method comprises: providing a set of data quality rules for the dataset; defining at least one delta rule of the set of data quality rules as relevant for delta analysis of at least part of the dataset, the delta rule being a delta analysis quality rule; tracking data changes on the dataset; in response to determining that a number of modified records of the at least part of the dataset is higher than a predefined insert modification threshold, determining a data quality score for said modified records using the delta rule.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
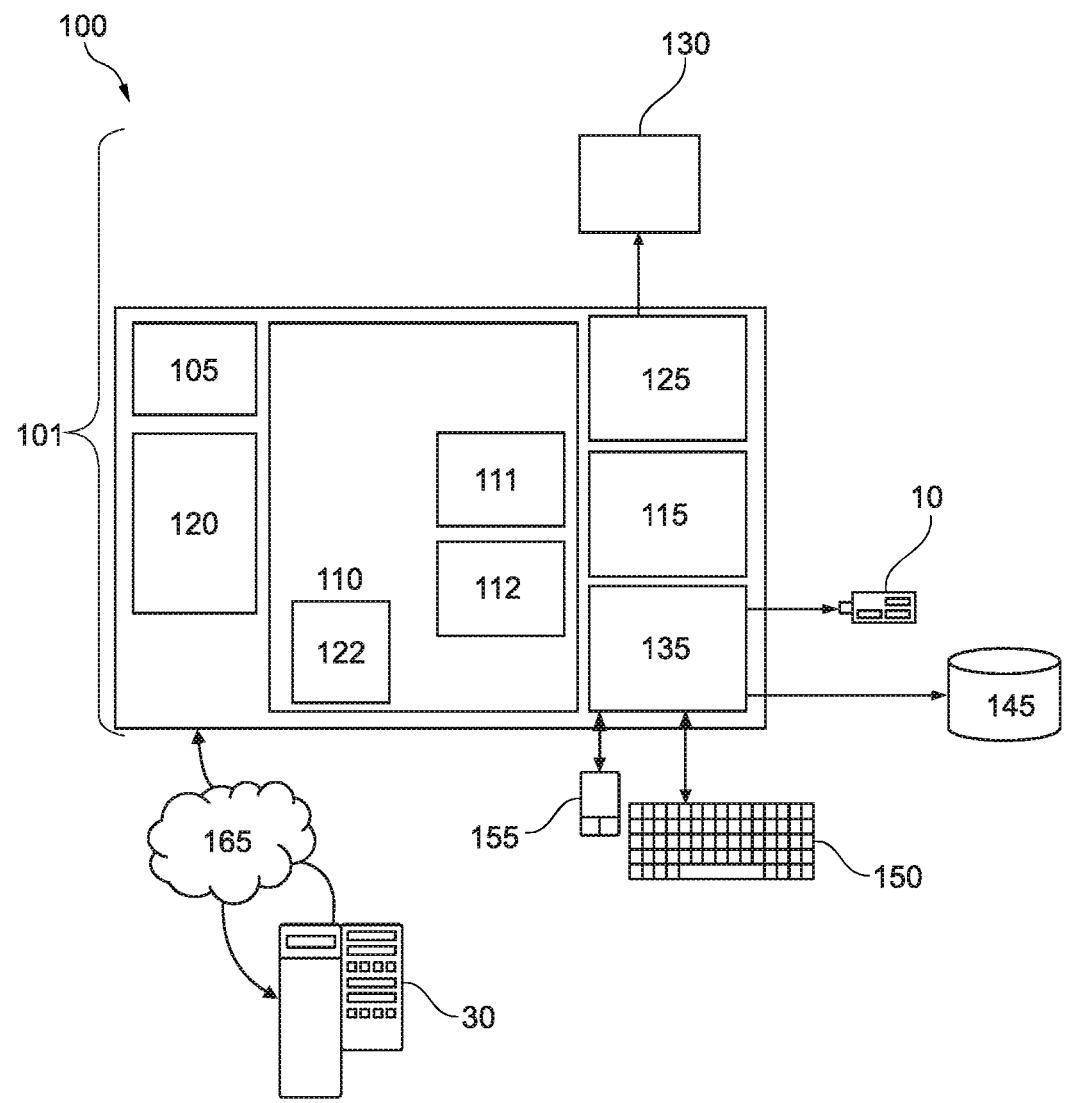
FIG. 1 represents a computerized system, suited for implementing one or more methods or portions of methods as involved in the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present disclosure relate to digital computer systems, and more particular aspects relate to a method for data quality delta analysis on a dataset. While the present disclosure is not necessarily limited to such applications, various aspects of the disclosure may be appreciated through a discussion of various examples using this context.

In accordance with embodiments of the present disclosure, a focused quality analysis may be performed based on changes that occur in a dataset. The present disclosure may enable saving processing recourses that would otherwise be required to perform a quality analysis of a whole dataset. Data quality monitoring is an input/output (I/O) intensive and time-consuming operation. Instead of processing all the data that is in the scope for the baseline measurement, this disclosure focuses on monitoring delta data modifications especially for large data sets with a relatively small share of modifications compared to the total number of records.

To provide for improved performance of operational data, a cognitive approach can be used to evaluate and correct the effectiveness of quality rules enabled for delta quality analysis, which can allow for enabling only quality rules which have an advantageous number of modifications per period compared with the total number of records and that their total number of reorganizations from a reorganization history does not exceed a Reorganization Review Threshold (RRT). Using such an approach, event triggers which could have a negative impact on performance are limited to cases where it will be advantageous and disadvantageous triggers can be avoided. This can improve the operation of a computer by effectively using resources when appropriate and allowing those resources to be used elsewhere when it would not be advantageous. These improvements and/or advantages are a non-exhaustive list of example advantages. Embodiments of the present disclosure exist which can contain none, some, or all of the aforementioned advantages and/or improvements.

FIG. 1 represents a general computerized system, suited for implementing methods or portions of methods as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software (including instructions 112), firmware (including basic input output system (BIOS) 122), hardware (such as processor 105), or a combination thereof. In some embodiments, the methods described herein are implemented in software, as an executable program, and are executed by a special or general-purpose digital computer, such as a personal computer, workstation, minicomputer, or mainframe computer. The most general system 100 therefore includes a general-purpose computer 101.

In exemplary some embodiments, in terms of hardware architecture, as shown in FIG. 1, the computer 101 includes a processor 105, memory (main memory) 110 coupled to a memory controller 115, and one or more input and/or output (I/O) devices (or peripherals) 10 and 145 that are communicatively coupled via an input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10 and 145 may generally include any generalized cryptographic card or smart card known in the art.

The processor 105 can be a hardware device for executing software, particularly software stored in memory 110. The processor 105 can be any custom made or commercially available processor, a central processing unit (CPU), an auxiliary processor among several processors associated with the computer 101, a semiconductor-based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM)). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 (e.g., instructions to manage databases such as a database management system).

The software in memory 110 can also include a suitable operating system (OS) 111. The OS 111 essentially controls the execution of other computer programs, such as possibly software 112 for implementing methods as described herein.

The methods described herein may be in the form of a source program, executable program (object code), script, or any other entity comprising a set of instructions 112 to be performed. When instructions 112 are a source program, then the program may need to be translated via a compiler, assembler, interpreter, or the like, which may or may not be included within the memory 110, so as to operate properly in connection with the OS 111. Furthermore, the methods can be written as an object-oriented programming language, which can include classes of data and methods, or a procedure programming language, which can include routines, subroutines, and/or functions.

In some embodiments, a keyboard 150 and mouse 155 can be coupled to the input/output controller 135. Other output devices such as the I/O devices 145 may include input devices, for example but not limited to a printer, a scanner, microphone, and the like. Finally, the I/O devices 10 and 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10 and 145 can be any generalized cryptographic card or smart card known in the art. The system 100 can further include a display controller 125 coupled to a display 130. In some embodiments, the system 100 can further include a network interface for coupling to a network 165. The network 165 can be an IP-based network for communication between the computer 101 and any external server, client, and the like via a broadband connection. The network 165 transmits and receives data between the computer 101 and external systems 30, which can be involved to perform part or all of the operations of the methods discussed herein. In some embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS can be a set of essential software routines that initialize and test hardware at startup, start the OS 111, and support the transfer of data among the hardware devices. The BIOS can be stored in ROM so that the BIOS can be executed when the computer 101 is activated.

When the computer 101 is in operation, the processor 105 can be configured to execute software 112 stored within the memory 110, to communicate data to and from the memory 110, and to generally control operations of the computer 101 pursuant to the software. The methods described herein and the OS 111, in whole or in part, can be read by the processor 105, possibly buffered within the processor 105, and then executed.

When the systems and methods described herein are implemented in software 112, the methods can be stored on any computer readable medium, such as storage 120, for use by or in connection with any computer related system or method. The storage 120 may comprise a disk storage such as HDD storage.

Figure 2:
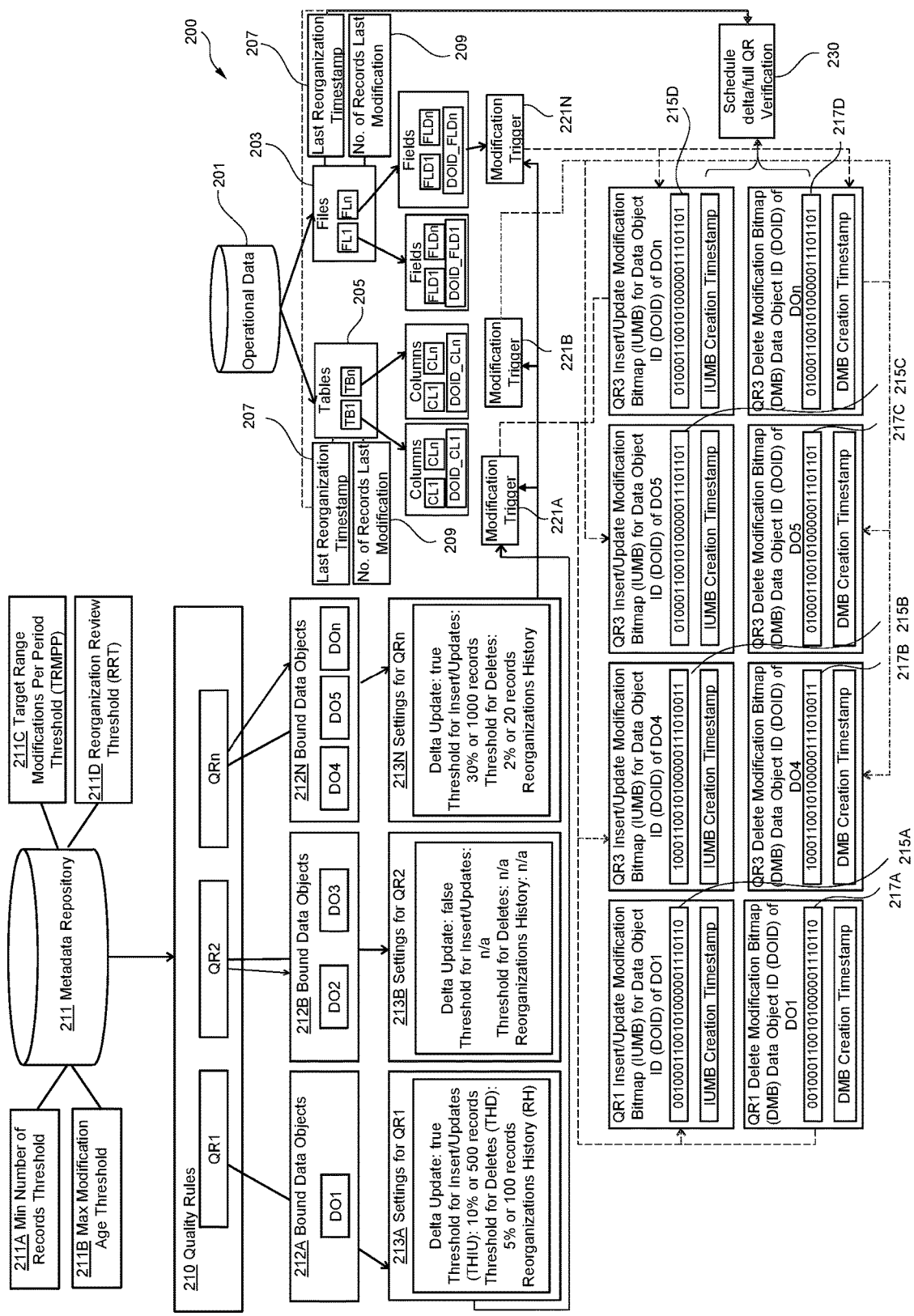
FIG. 2 is a diagram illustrating data storage system in accordance with some embodiments of the present disclosure.

FIG. 2 is a diagram illustrating a data storage system 200 in accordance with some embodiments of the present disclosure. The data storage system 200 is depicted for example purposes and many modifications can be made consistent with the present disclosure. As non-limiting examples, additional or fewer quality rules, data objects, files, tables, fields, columns, and/or other items depicted in data storage system 200 can exist in embodiments. Throughout FIG. 2, depicted are items with numbers from 1 to "n" or variations thereof. As used herein, this "n" can refer to any number of such items, including 1, 2, 3 etc., up to "n." The numbers "n" of the various items depicted in FIG. 2 do not have to be the same "n" for each item (e.g., there may be a different number "n" of tables compared to the number "n" of quality rules).

The data storage system 200 comprises a database 201 of operational data. The operational data may comprise files 203 and/or tables 205. As shown in FIG. 2, the tables 205 may comprise tables TB1 to TBn, wherein each table (e.g., TB1) has columns CL1-CLn and that table may be associated with a data object ID indicating a column of the table as follows: DOID_CL1. As shown in FIG. 2, the files 203 may comprise files FL1 to FLn, wherein each file e.g. FL1 has fields FLD1-FLDn and that file may be associated with a data object ID indicating a field of the file as follows: DOID_FLDn.

The files 203 and the tables 205 may be associated with a last reorganization timestamp 207. The last reorganization timestamp 207 may indicate the time at which the files and/or tables have been reorganized. In some embodiments, there can be a last reorganization timestamp 207 for each of the files and tables, while in other embodiments, there may be one last reorganization timestamp 207.

Each of the files 203 and the tables 205 may be associated with a last modification timestamp 209. The last modification timestamp 209 may indicate the time at which the respective file or table has been modified.

The data storage system 200 further comprises a metadata repository 211. The metadata repository 211 may comprise a set of data quality rules for the operational data of the database 201. The metadata repository 211 may be associated with predefined thresholds such as a minimum number of records (211A), maximum modification age (211B), target range modifications per period (TRMPP) (211C), and reorganization review threshold (RRT) number (211D). TRMPP may indicate a lower and upper value of a number of modifications that can occur over a given time period.

As shown in FIG. 2, the metadata repository 211 may comprise data quality rules 210 including QR1-QRn. Each of the data quality rules QR1-QRn may be associated with respective set of data objects 212A-212N (or bound data objects) of the data objects DO1-DOn. For example, QR1 may be associated a set of data objects 212A comprising data object DO1. For example, a data object may be one or more columns of a table and/or one or more fields of a file. In this case, the set of data objects associated with a quality rule may involve a respective set of files or set of tables (Bound data sets) that comprise the set of data objects. Furthermore, each of the data quality rules QR1-QRn may be associated with respective settings 213A-213N.

A setting 213A-213N of a data quality rule QR1-QRn may comprise values of one or more setting parameters. For example, a setting parameter "Delta Update" may indicate whether or not the associated QR is to be used for performing a delta analysis. A setting parameter "Threshold for Insert/Updates" (THIU) may indicate a threshold number or percentage of inserts/updates. A setting parameter "Threshold for Deletes" (THD) may indicate a threshold number or percentage of deletes. A setting parameter "Reorganizations History" (RH) may indicate a total number of reorganizations of the data associated with the quality rule.

Each of the data quality rules QR1-QRn may be associated with respective insert bitmap (or insert/update modification map (IUMB)) 215A-215D and delete bitmap (or delete modification bitmap (DMB)) 217A-217D for each data object of the quality rule. For example, data quality rule QR1 may be associated with insert bitmap 215A and delete bitmap 217A for data object DO1 that is associated with the data quality rule QR1. The insert bitmap 215A-215D may comprise a bit for each record of the data object that is associated with the insert bitmap 215A-215D. When a record is modified by an update or insert operation, the corresponding bit in the insert bitmap 215A-215D may be set accordingly. The delete bitmap 217A-217D may comprise a bit for each record of the data object that is associated with the delete bitmap 217A-217D. When a record is deleted, the corresponding bit in the delete bitmap 217A-217D may be set accordingly. Each bitmap of the insert bitmaps and delete bitmaps may be associated with a creation timestamp indicative of the creation date of the bitmap.

For each set of data objects of each QR (e.g., DO1 of QR1 or DO2-DO3 of QR2), a modification trigger 221A-221N may be created for sending data indicative of a modification of the set of data objects. This data may for example comprise a DOID, the trigger type and relative record ID (RRID) of the modified record. A RRID of a data record indicates the physical location for the data record (e.g., record 1 has RRID 1, record 200 has RRID 200).

Schedule component 230 may be configured to determine all data objects whose insert bitmap IUMB or delete bitmap DMB has a timestamp that was created earlier than the current last reorganization timestamp associated with the data object (e.g. the current last reorganization timestamp of data table that comprises the data object), and schedule a full quality analysis for analyzing all records associated with the quality rule being processed and subsequently resetting all modification bits to 0 in IUMB and IDB DMB plus updating the IUMB and IDB DMB creation timestamps with the current timestamp.

Figure 3:
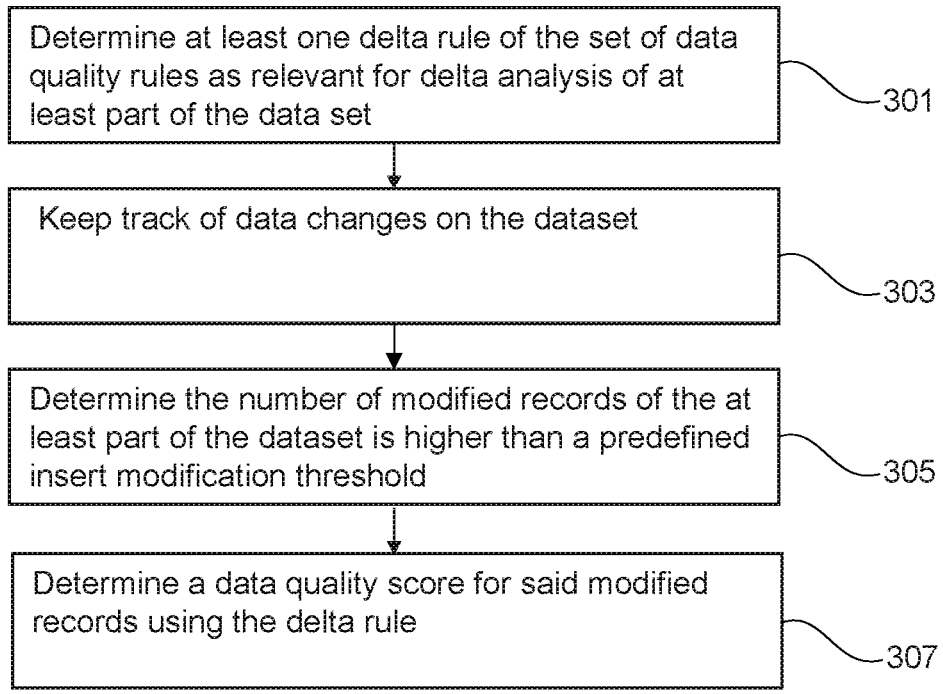
FIG. 3 is a flowchart of a method for data quality delta analysis on a dataset, in accordance with some embodiments of the present disclosure.

FIG. 3 is a flowchart of a method for data quality delta analysis on a dataset (e.g., files 203 and tables 205 of the Operational Data 201 of FIG. 2), in accordance with some embodiments of the present disclosure. FIG. 3 is discussed with regard to the data storage system depicted in FIG. 2 and discussed above; however, in other embodiments, the method of FIG. 3 can be performed using a different data storage system.

In operation 301, at least one delta rule of the set of data quality rules QR1-QRn is determined as relevant for delta analysis of at least part (e.g., DO1) of the dataset. The at least part of the dataset may comprise one or more tables (e.g., one or more of TB1 through TBn) and/or one or more files (e.g., one or more of FL1 through FLn).

In operation 303, a track of data changes on the dataset may be kept. For example, operation 303 may be a monitoring step for monitoring the status of the dataset continuously or over a predefined time period.

In operation 305, it is determined that a number of modified records of the at least part of the dataset (e.g., DO1) is higher than a predefined insert modification threshold. According to some embodiments, the number of modified records is the number of records that have been changed by a data insert or update operation.

In response to the determination at operation 305, a data quality score may be determined in operation 307 for said modified records using the delta rule.

Figure 4:
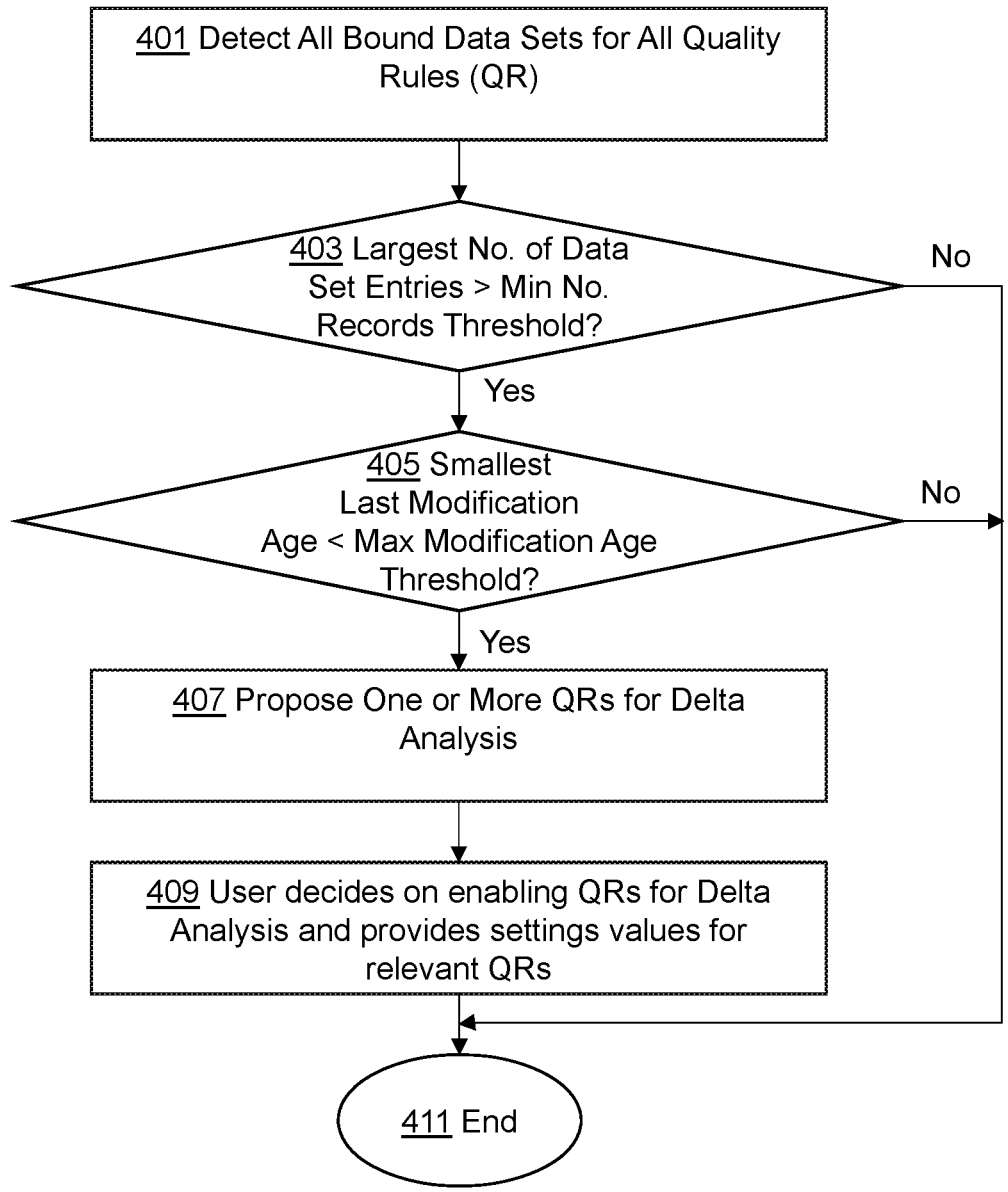
FIG. 4 is a flowchart of a method for setting up at least part of the data storage system, in accordance with some embodiments of the present disclosure.

FIG. 4 is a flowchart of a method for setting up at least part of the data storage system 200, in accordance with some embodiments of the present disclosure.

In operation 401, all sets of data objects 212A-212N associated with the data quality rules QR1-QRn may be identified. The data quality rules QR1-QRn can be those found in the metadata repository 211 of FIG. 2. In some embodiments, this may be done individually for each quality rule, while in other embodiments, all quality rules can be identified at once. For each data quality rule, the number of entries in a set of the data objects of a given rule can be identified. Once these numbers of entries are identified, the largest number (e.g., the number of entries in a set of the data objects between all the data quality rules), can be identified.

In operation 403, it may be determined if the largest number of entries in a set of the data objects determined at 401 is higher than a predefined minimum number of records. In doing so, the method determines if, for at least one quality rule (the one with the largest number of entries), this minimum is exceeded. If so, the method continues to operation 405. If the largest number of entries does not exceed this minimum, then all numbers of entries must be at or below the minimum and the method ends at 411. In some embodiments, if the largest number of entries is equal to the minimum may be, it may be treated as exceeding the minimum.

In operation 405, it may be determined if the smallest age of the last modification of the identified sets of the data objects (i.e., the set of data objects with the most recent modification's age) is smaller than a predefined maximum modification age. The age of a modification may be the time duration between the time at which the modification is performed and the current time (e.g., time at which operation 405 is performed). If this smallest age of the last modification is smaller than the threshold, the method proceeds to operation 407. If not, the method ends at 411.

Operation 407 is reached if the largest number of records is higher than the predefined minimum number of records and the smallest age of the last modification is smaller than the predefined maximum modification age. At 407, one or more quality rules may be provided for performing a delta analysis.

According to some embodiments, the quality rules to be provided can be identified in response to determining that at least one of the following conditions is fulfilled: the number of records of the dataset is higher than a predefined a minimum number of records and the age of a last change of the dataset is smaller than a predefined maximum modification age. Such embodiments may further save processing resources at it may control quality rule execution. Such embodiments provide thresholds for determining when the delta analysis should be scheduled.

In operation 409, a user, such as an administrator, may enable the one or more provided QRs for performing the delta analysis. Enabling the QR(s) can include setting the parameter settings 213A-213N discussed above regarding FIG. 2 associated with the provided QR. These can include whether Delta Update is enabled, a Threshold for Insert/Updates, a Threshold for Deletes, a Reorganization History, or other settings as appropriate. Enabling the one or more provided QRs can trigger an initialization process, discussed below regarding FIG. 5.

At operation 411, the method of FIG. 4 ends.

Figure 5:
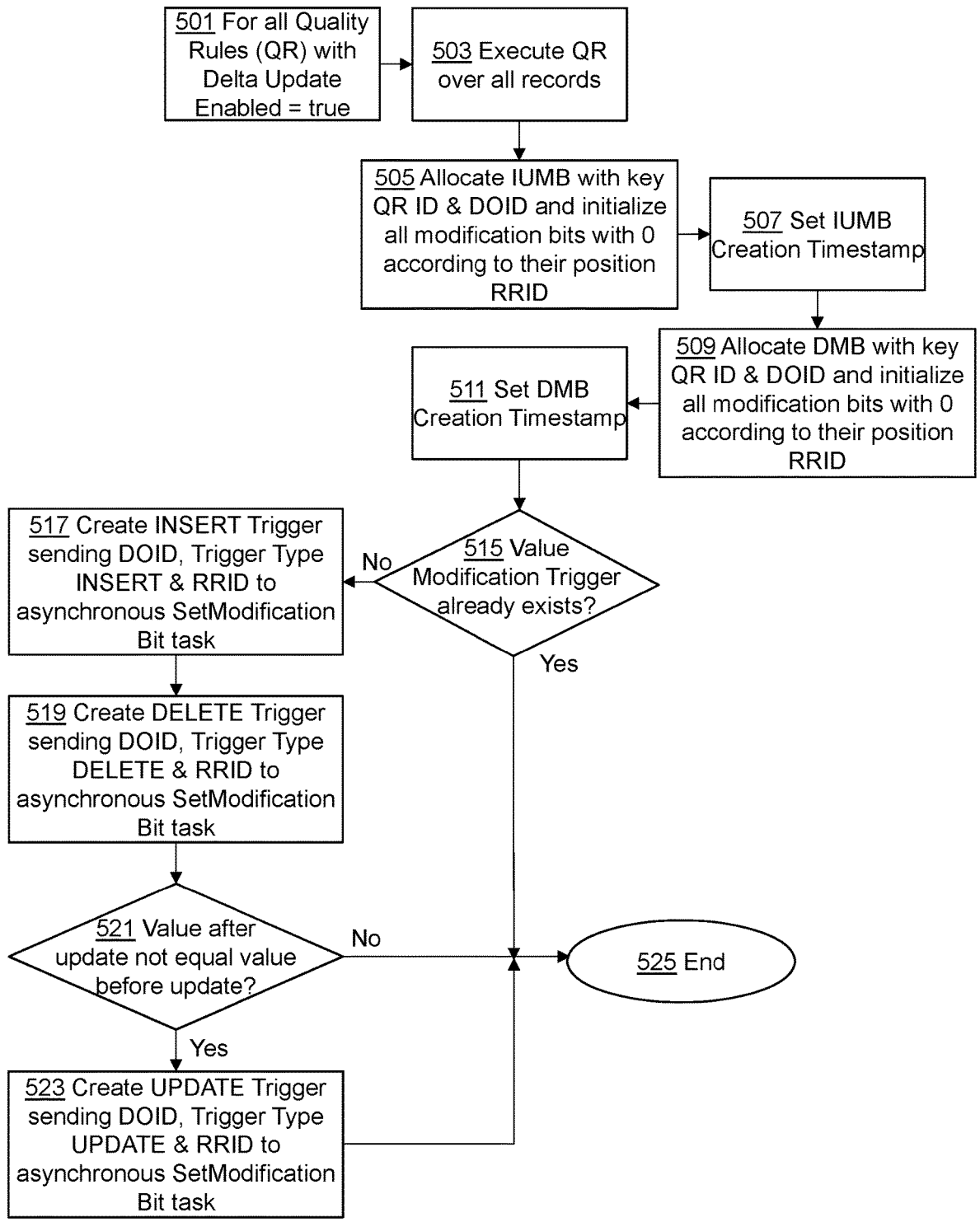
FIG. 5 is a flowchart of a method for an initialization in the data storage system, in accordance with some embodiments of the present disclosure.

FIG. 5 is a flowchart of a method for an initialization in the data storage system 200, in accordance with some embodiments of the present disclosure. The method of FIG. 5 can commence upon completion of the method of FIG. 4.

In operation 501, the settings 213A-213N may be checked to determine all quality rules QRs that have a setting parameter "Delta Update" set to "true" indicating that a delta analysis may be performed by the corresponding QR. For each determined QR, operations 503 to 523 may be executed.

In operation 503, each determined QR of operation 501 may be executed on all records of the database 201 that are bound to the determined QR.

For each data object associated with each determined QR, operations 505 to 523 may be performed.

In operation 505, an insert bitmap, specifically an Insert Update Modification Bitmap (IUMB), may be assigned to the data object. The insert bitmap may be associated with a DOID of the data object and a QR ID of the QR. The bits of the insert bitmap may be initialized with zero according to their position RRID.

In operation 507, a creation timestamp of the insert bitmap may be set for the insert bitmap.

In operation 509, a delete bitmap, specifically a Delete Modification Bitmap (DMB), may be assigned to the data object. The delete bitmap may be associated with a DOID of the data object and a QR ID of the QR. The bits of the delete bitmap may be initialized with zero according to their position RRID.

In operation 511, a creation timestamp of the delete bitmap may be set for the delete bitmap.

In operation 515, it may be determined if a value modification trigger already exists for the data object. If a value modification trigger does exist, the method ends at 525.

If a value modification trigger does not exist for the data object, an insert trigger may be created in operation 517 and information indicative of the insert trigger such as the DOID of the data object and a trigger type value indicating that the trigger is related to an insert operation, and a relative record ID (RRID) may be sent as a trigger message to a task module that is configured to perform an asynchronous SetModification bit task. And a delete trigger may be created in operation 519 and information indicative of the delete trigger such as the DOID of the data object and a trigger type value indicating that the trigger is related to a delete operation and a relative record ID (RRID) may be sent as a trigger message to the task module.

In operation 521, a determination can be made whether the update operation results in a change of the updated value (i.e., not equal to the value before the update). If not, the method ends at 525. If the value changes, an update trigger may be created in operation 523 and information indicative of the update trigger such as the DOID of the data object and a trigger type value indicating that the trigger is related to an update operation and a relative record ID (RRID) may be sent as a trigger message to the task module. After operation 521, the method ends at 525.

Figure 6:
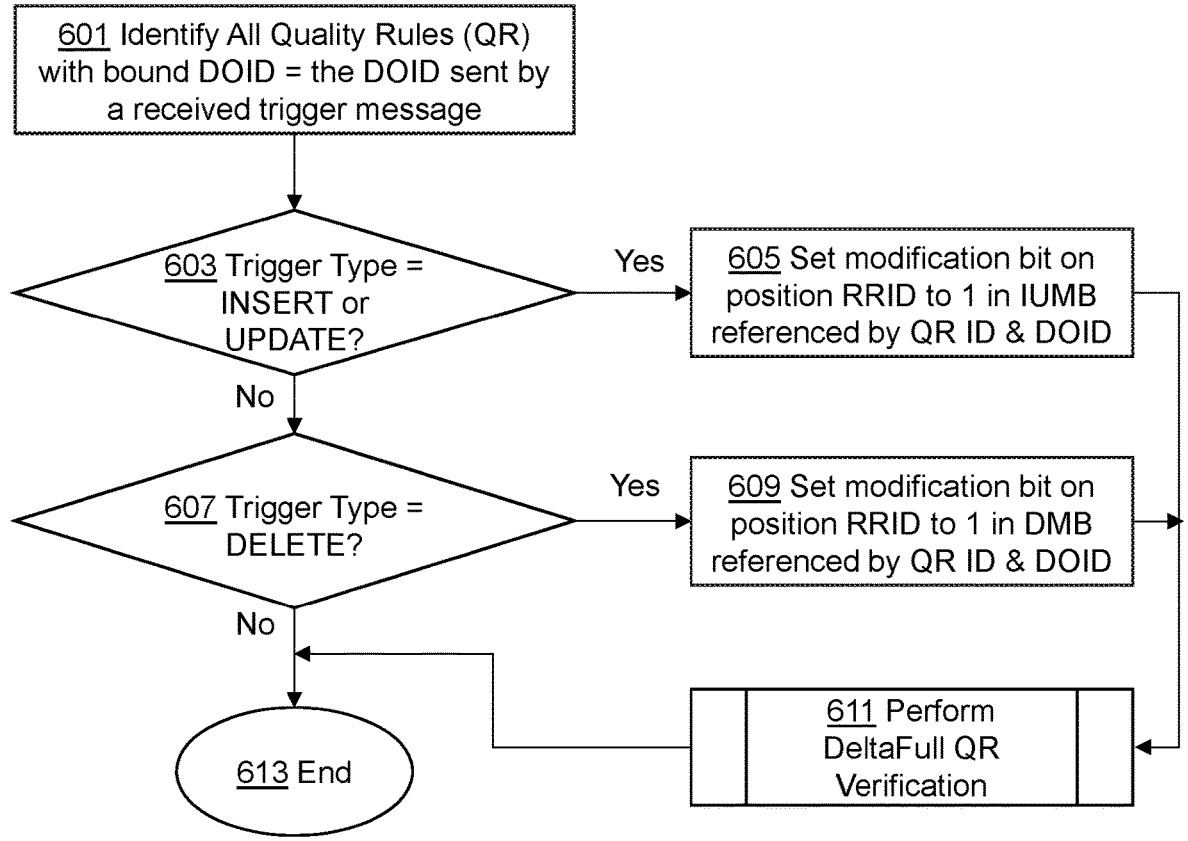
FIG. 6 is a flowchart of a method for performing an asynchronous SetModification bit task by a task module, in accordance with some embodiments of the present disclosure.

FIG. 6 is a flowchart of a method for performing an asynchronous SetModification bit task by the task module, in accordance with some embodiments of the present disclosure. In some embodiments, the method of FIG. 6 can be performed following the completion of the method of FIG. 5.

In operation 601, all quality rules QR that are associated with a given data object that is indicated or referred to by a trigger message received at the task module may be identified. This can be identified by determining if the DOID matches the DOID sent by a trigger message. As describe with reference to FIG. 5, the received trigger message may indicate the trigger type, RRID of affected/modified record, and the DOID of the given data object. Operations 603 to 611 may be performed for each identified QR of operation 601.

At operation 603, it is determined if the trigger type of the received trigger message is an insert type or update type. If so, the RRID of the received trigger message may be used to identify the bit of the insert bitmap (IUMB), of the given data object and associated QR, that corresponds to the RRID. That identified bit may be set in operation 605 to the value of one.

If at 603, it was not determined that the trigger type was insert or update, the method proceeds to operation 607 and it is determined if the trigger type of the received trigger message is a delete type. If so, the RRID of the received trigger message may be used to identify the bit of the delete bitmap (DMB), of the given data object and associated QR, that corresponds to the RRID. That identified bit may be set in operation 609 to the value of one.

Figure 7:
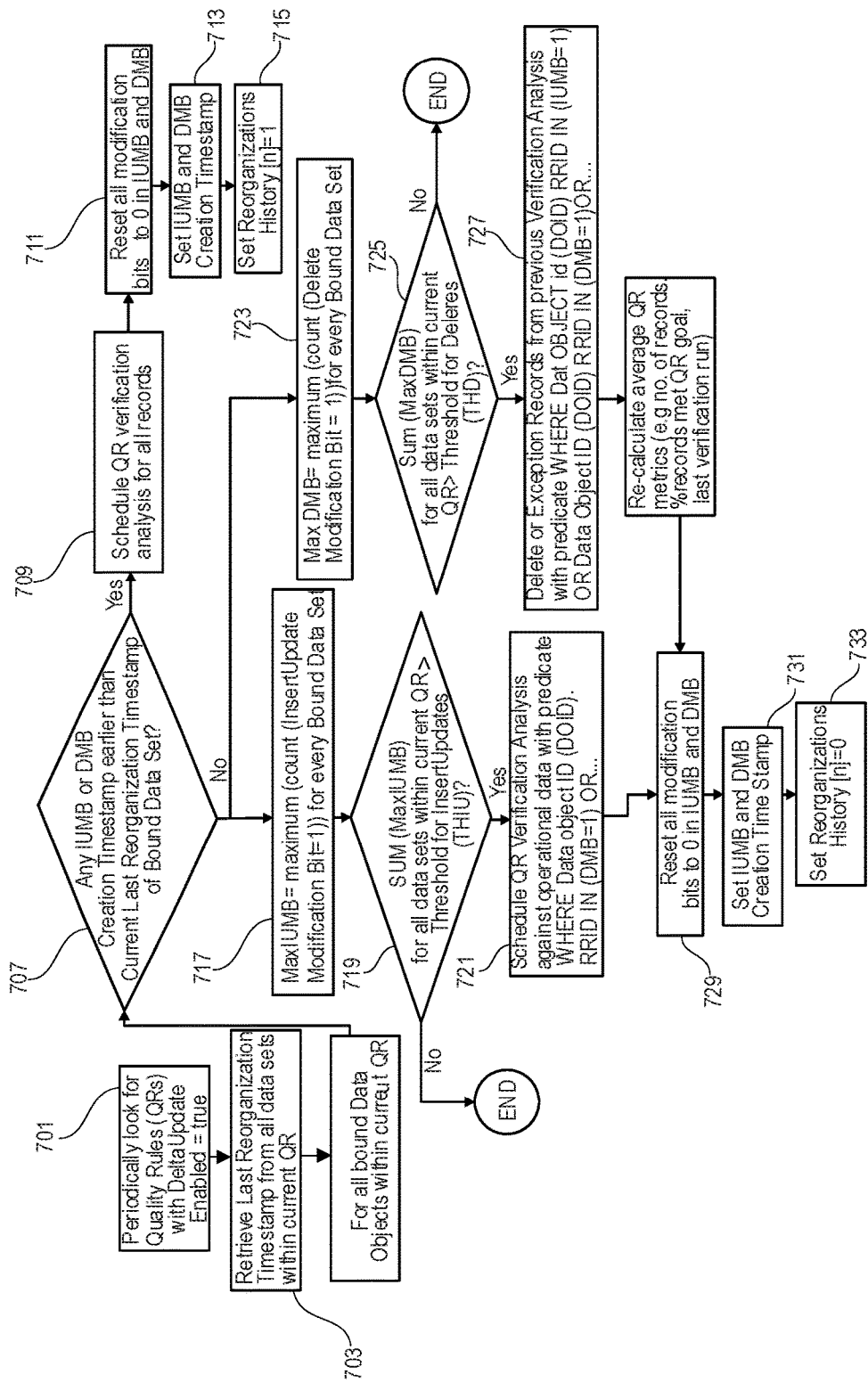
FIG. 7 is a flowchart of a method for performing full or delta quality analysis, in accordance with some embodiments of the present disclosure.

Upon completion of either operation 605 or operation 609, the method proceeds to subprocess 611 where a DeltaFull QR Verification is performed, which is discussed in more detail with regard to FIG. 7. If at 607, it was not determined that the trigger type was delete, the method proceeds to end at 613.

FIG. 7 is a flowchart of a method for performing full or delta quality analysis, in accordance with some embodiments of the present disclosure. In some embodiments, the method of FIG. 7 can be performed following the completion of the method of FIG. 6 or as a part of the method of FIG. 6 as subprocess 611.

In operation 701, quality rules associated with a parameter setting "Delta Update" having value "true" may periodically be determined.

Operations 703-733 may be performed for each determined QR of operation 701.

In operation 703, the last reorganization timestamp associated with data of the determined QR may be determined. The following steps can be performed for all bound data objects within the current QR.

In operation 707, it is determined whether the creation time stamp of the insert bitmap (IUMB) or the creation timestamp of the delete bitmap (DMB) of any data object of the determined QR is earlier than the determined last reorganization timestamp. If so, operations 709 to 715 may be performed, or if not, operations 717 to 733 may be performed.

All records of the data bound to the determined QR may be verified using the determined QR in operation 709. This can be performed immediately or scheduled for another time. The bits of the insert bitmap (IUMB) and delete bitmap (DMB) of the data object may be reset to zero in operation 711. The creation timestamp of the insert bitmap and delete bitmap may be set in operation 713. The reorganization history variable may be set in operation 715. The reorganization history may be set to indicate the total number of reorganizations, which in some embodiments can occur by incrementing the current value by one.

If the result of operation 707 is "no," the method proceeds to operations 717 and 723. In some embodiments these can be performed simultaneously, while in other embodiments they may be performed sequentially. The maximum number of modified records is determined in steps 717 and 723 for every bound data set (e.g., every data set may comprise multiple data objects and thus may have multiple IUMBs and DMBs) of the determined QR by evaluating the maximum number of bits of IUMB equal to 1 and maximum number of bits of DMB equal to 1. Then the sum of the evaluated maximum numbers of IUMB 1 bits and of evaluated maximum numbers of DMB 1 bits of the determined QR is compared with the inserts/updates threshold and deletes threshold (operations 719 and 725 respectively). If at 719 the inserts/updates threshold has been reached for the determined QR then a delta quality analysis against operational data can be scheduled at operation 721, limiting the records to be analyzed to the RRIDs according to IUMB=1 for the bound data sets (e.g., only records having an associated bit=1 in the IUMBs of the bound data sets of the determined QR may be analyzed with the delta analysis).

If at 725 the deletes threshold has been reached, no operational data needs to be analyzed. Instead, at operation 727, the QR Exception Records from a previous verification analysis are deleted according to their RRID as coming from DMB=1. Overall predefined QR metrics may be re-calculated (e.g., using data bound by the determined QR). In the end, all modification bits are reset to 0 in IUMB and IDB in operation 729. The IUMB and DMB creation timestamps are updated with the current timestamp in operation 731 and the Reorganizations History [n] is set to 0 in operation 733.

The delta rule may be applied to data that has changed during a predefined time period (e.g., the last month) in order to determine one or more quality scores (e.g., this may be performed as part of performing a delta analysis).

According to some embodiments, the method further comprises assigning the insert modification threshold and a delete modification threshold to the delta rule; the method further comprising in response to determining that a number of deleted records of the dataset is higher than the delete modification threshold determining the quality score for all records of the dataset or determining the quality score for all records of the at least part of the dataset. Deleting a high number of records may indicate that the quality of the remaining data may change. This embodiment may take this into account by updating the quality scores for the remaining data.

According to some embodiments, the dataset comprises multiple data objects, wherein defining the at least one delta rule comprises defining multiple delta rules, each delta rule of the multiple rules being associated with a respective set of data objects of the dataset, the method further comprising performing the determining step for each delta rule of the multiple delta rules using the modified records of the set of data objects that are associated with the respective delta rule. A data object may for example be a column of a table or a field of a file. For example, if two quality rules QR1 and QR2 are defined. QR1 may for example be relevant for data object DO1 and DO2 and QR2 may be relevant for data objects DO3 and DO4. The data objects DO1 and DO2 are associated with QR1 and data objects DO3 and DO4 are associated with QR2. The method may be performed for QR1 and QR2. For QR1, it may be determined if a number of modified records of DO1 and DO2 is higher than the predefined insert modification threshold, and if so a data quality score may be determined for said modified records of DO1 and DO2 using the delta rule QR1. For QR2, it may be determined if a number of modified records of DO3 and DO4 is higher than the predefined insert modification threshold, and if so a data quality score may be determined for said modified records of DO3 and DO4 using the delta rule QR2. This embodiment may enable a modular and distributed implementation of the quality analysis.

According to some embodiments, the method further comprises creating an insert bitmap for each given delta rule of the multiple delta rules, wherein each bit of the bitmaps is associated with a record of the set of data objects associated with the given delta rule, wherein the tracking of the data changes comprises: in response to detecting a change of a data record of the dataset, setting a bit associated with the changed record in the one or more insert bitmaps associated with the changed record depending on the type of the change, wherein the number of modified records is determined using the insert bitmap. A bit of the insert bitmap is set if the corresponding record is changed by an insert or update operation such as the SQL INSERT and SQL UPDATE operations. Following the above example of QR1 and QR2, QR1 may be associated with two insert bitmaps IUMB1 and IUMB2 associated with DO1 and DO2 respectively and QR2 may be associated with two insert bitmaps IUMB3 and IUMB4 associated with DO3 and DO4 respectively. For example, if a record of DO1 is changed the corresponding bit of the bitmap IUMB1 associated with DO1 is set to 1. The number of modified records associated with QR1 may be the number of bits equal to one in IUMB1 and IUMB2. The number of modified records associated with QR2 may be the number of bits equal to one in IUMB3 and IUMB4. This embodiment may enable a systematic and efficient implementation of the present method.

According to some embodiments, the method further comprises associating with each bitmap of the bitmaps a key, wherein the key comprises an identifier of a delta rule and an identifier of a data object of the bitmap. Following the above example, IUMB1 may be associated with a key comprising an ID of DO1 and an ID of QR1. IUMB2 may be associated with a key comprising an ID of DO2 and an ID of QR1. IUMB3 may be associated with a key comprising an ID of DO3 and an ID of QR2. IUMB4 may be associated with a key comprising an ID of DO4 and an ID of QR2. This may enable an efficient search of IUMBs and thus efficient quality rule implementation.

According to some embodiments, the method further comprises creating an insert bitmap for the delta rule and for at least a part of the dataset, wherein each bit of the bitmaps is associated with a record of the at least part of the dataset, wherein the tracking comprises in response to detecting a change of a data record of the at least part of the dataset, setting a bit associated with the changed record in the insert bitmap depending on the type of the change, the method further comprising resetting all bits of the insert bitmap after determining the data quality score. This may enable an up-to-date framework of scoring.

According to some embodiments, the method further comprises assigning to the insert bitmap and to a delete bitmap of the delta rule a creation time, wherein the determining step is performed in case the creation time of the insert bitmap or the creation time of the delete bitmap is later than a reorganization time, wherein the reorganization time is a time at which the dataset is lastly reorganized. Following the above example of QR1 and QR2, QR1 may be associated with two delete bitmaps DMB1 and DMB2 associated with DO1 and DO2 respectively and QR2 may be associated with two delete bitmaps DMB3 and DMB4 associated with DO3 and DO4 respectively. For example, if a record of DO3 is deleted the corresponding bit of the delete bitmap DMB3 associated with DO3 is set to 1. Each of the insert bitmaps IUMB1 to IUMB4 and each of the delete bitmaps DMB1 to DMB4 may be associated with respective creation timestamp. If all the 4 timestamps of IUMB1 to IUMB2 and DMB1 to DMB2 are later than the reorganization time, the determining step may be performed for QR1. If all the 4 timestamps of IUMB3 to IUMB4 and DMB3 to DMB4 are later than the reorganization time, the determining step may be performed for QR2.

In case of QR1, the reorganization time may be the last time at least one of the tables or the files that have data objects DO1 and DO2 have been reorganized. In case of QR2, the reorganization time may be the last time at least one of the tables or the files that have data objects DO3 and DO4 have been reorganized.

According to some embodiments, the method further comprises in response to determining that the creation time of the bitmaps is later than the reorganization time, determining the data quality score for all records of the at least part of the dataset (of the delta rule) and resetting all bits of the insert and delete bitmaps. Following the above example, if any of the 4 timestamps of IUMB1 to IUMB2 and DMB1 to DMB2 is earlier than the reorganization time, analysis of all records may be performed using QR1. If any of the 4 timestamps of IUMB3 to IUMB4 and DMB3 to DMB4 is earlier than the reorganization time, analysis of all records may be performed using QR2.

Figure 8:
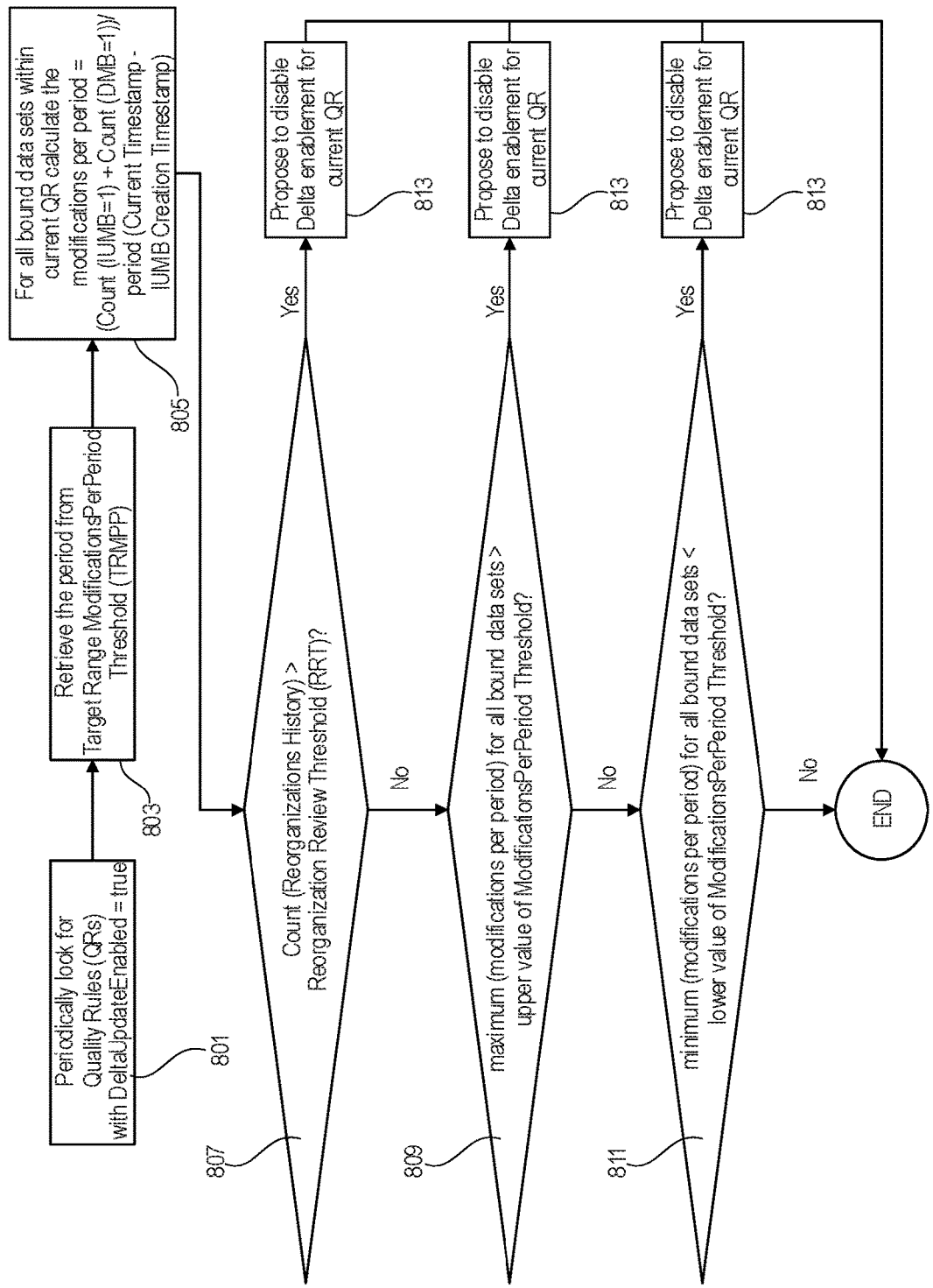
FIG. 8 is a flowchart of a method for a cognitive approach for reviewing the effectiveness of the data storage system, in accordance with some embodiments of the present disclosure.

FIG. 8 is a flowchart of a method for a cognitive approach for reviewing the effectiveness of the data storage system 200, in accordance with some embodiments of the present disclosure.

In operation 801, quality rules QRs associated with a parameter setting "Delta Update" having value "true" may periodically be determined. For each determined QR, operations 805 to 813 may be performed.

In operation 803, a period may be retrieved from the TRMPP threshold associated with the metadata repository 211.

In operation 805, for each bound data set of the determined QR a number of modifications per period may be calculated as follows:

(Count (IUMB=1)+Count (DMB=1))/period (Current Timestamp−IUMB Creation Timestamp), where Count (IUMB=1) is the number of bits=1 in the IUMBs of the bound datasets and Count (DMB=1) is the number of bits=1 in the DMBs of the bound datasets. "IUMB creation timestamp" may be the earliest creation timestamps of the IUMBs of the bund datasets. This may result in multiple numbers of modifications.

In operation 807, it may be determined if the current total number of reorganizations associated with the determined QR is higher than the Reorganization Review Threshold (RRT).

If the current total number of reorganizations associated with the determined QR is higher than the RRT, a proposal to update the parameter setting "Delta Update" (e.g. to value "false") of the determined QR may be performed in operation 813. Otherwise, operation 809 may be performed.

In operation 809, it may be determined if the maximum of the multiple numbers of modifications is higher than the upper value of ModificationsPerPeriod Threshold. If the maximum of the multiple numbers of modifications is higher than the upper value of ModificationsPerPeriod Threshold, operation 813 may be performed, otherwise operation 811 may be performed.

If it is determined at 811 that the minimum of the multiple numbers of modifications is smaller than the lower value of ModificationsPerPeriod Threshold, operation 813 may be performed.

After operation 813 is performed or if the result of each of operations 807, 809, and 811 were "no," the method ends.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for data quality delta analysis on a dataset:
    providing a set of data quality rules for the dataset;
    defining at least one delta rule of the set of data quality rules as relevant for delta analysis of at least part of the dataset, the delta rule being a delta analysis quality rule;
    tracking data changes on the dataset;
    in response to determining that a number of modified records of the at least part of the dataset is higher than a predefined insert modification threshold, determining a data quality score for said modified records using the delta rule.

2. The method of claim 1, the defining of the delta rule being performed in response to determining that at least one of the following conditions is fulfilled: a number of records of the dataset is higher than a predefined minimum number of records and an age of a last change of the dataset is smaller than a predefined maximum modification age.

3. The method of claim 1, wherein the number of modified records is the same as a number of records that have been changed by a data insert or update operation.

4. The method of claim 1, further comprising:
    assigning the insert modification threshold and a delete modification threshold to the delta rule;
    in response to determining that a number of deleted records of the dataset is higher than the delete modification threshold determining the quality score for all records of the dataset.

5. The method of claim 1, wherein the dataset comprises multiple data objects, wherein defining the at least one delta rule comprises defining multiple delta rules, each delta rule of the multiple delta rules being associated with a respective set of data objects of the dataset, and the method further comprising: performing the determining step for each delta rule of the multiple delta rules using the modified records of the set of data objects that are associated with the respective delta rule.

6. The method of claim 5, further comprising: creating an insert bitmap for each given delta rule of the multiple delta rules, wherein each bit of the bitmaps is associated with a record of the set of data objects associated with the given delta rule;
    wherein the tracking of the data changes comprises: in response to detecting a change of a data record of the dataset, setting a bit associated with the changed record in the one or more insert bitmaps associated with the changed record depending on a type of the change, wherein the number of modified records is determined using the insert bitmap.

7. The method of claim 6, further comprising: associating with each bitmap of the bitmaps a key, wherein the key comprises an identifier of a delta rule and an identifier of a data object of the bitmap.

8. The method of claim 1, further comprising: creating an insert bitmap for the delta rule and for at least a part of the dataset, wherein each bit of the bitmaps is associated with a record of the at least part of the dataset, wherein the tracking comprises in response to detecting a change of a data record of the at least part of the dataset, setting a bit associated with the changed record in the insert bitmap depending on the type of the change, the method further comprising resetting all bits of the insert bitmap after determining the data quality score.

9. The method of claim 8, further comprising: assigning to the insert bitmap and to a delete bitmap of the delta rule a creation time, wherein the determining step is performed when the creation time of the insert bitmap or the creation time of the delete bitmap is later than a reorganization time, wherein the reorganization time is a time at which the dataset is reorganized.

10. The method of claim 9, further comprising: in response to determining that the creation time of the insert bitmap and delete bitmap is earlier than the reorganization time, determining the data quality score for all records of the at least part of the dataset and resetting all bits of the insert bitmap and delete bitmap.

11. A computer program product for data quality delta analysis on a dataset, the computer program product comprising a computer-readable storage medium having program instructions embodied therewith, wherein the computer readable storage medium is not a transitory signal per se, the program instructions executable by a computer to perform a method comprising:
    providing a set of data quality rules for the dataset;
    defining at least one delta rule of the set of data quality rules as relevant for delta analysis of at least part of the dataset, the delta rule being a delta analysis quality rule;
    tracking data changes on the dataset;
    in response to determining that a number of modified records of the at least part of the dataset is higher than a predefined insert modification threshold, determining a data quality score for said modified records using the delta rule.

12. The computer program product of claim 11, the defining of the delta rule being performed in response to determining that at least one of the following conditions is fulfilled: a number of records of the dataset is higher than a predefined minimum number of records and an age of a last change of the dataset is smaller than a predefined maximum modification age.

13. The computer program product of claim 11, wherein the number of modified records is the same as a number of records that have been changed by a data insert or update operation.

14. The computer program product of claim 11, further comprising:
assigning the insert modification threshold and a delete modification threshold to the delta rule;
in response to determining that a number of deleted records of the dataset is higher than the delete modification threshold determining the quality score for all records of the dataset.

15. The computer program product of claim 11, wherein the dataset comprises multiple data objects, wherein defining the at least one delta rule comprises defining multiple delta rules, each delta rule of the multiple delta rules being associated with a respective set of data objects of the dataset, and the method further comprising: performing the determining step for each delta rule of the multiple delta rules using the modified records of the set of data objects that are associated with the respective delta rule.

16. A system for data quality delta analysis on a dataset, the system comprising:
one or more processors; and
a memory communicatively coupled to the one or more processors,
wherein the memory comprises instructions which, when executed by the one or more processors, cause the one or more processors to perform a method comprising:
providing a set of data quality rules for the dataset;
defining at least one delta rule of the set of data quality rules as relevant for delta analysis of at least part of the dataset, the delta rule being a delta analysis quality rule;
tracking data changes on the dataset;
in response to determining that a number of modified records of the at least part of the dataset is higher than a predefined insert modification threshold, determining a data quality score for said modified records using the delta rule.

17. The system of claim 16, the defining of the delta rule being performed in response to determining that at least one of the following conditions is fulfilled: a number of records of the dataset is higher than a predefined minimum number of records and an age of a last change of the dataset is smaller than a predefined maximum modification age.

18. The system of claim 16, wherein the number of modified records is the same as a number of records that have been changed by a data insert or update operation.

19. The system of claim 16, further comprising:
assigning the insert modification threshold and a delete modification threshold to the delta rule;
in response to determining that a number of deleted records of the dataset is higher than the delete modification threshold determining the quality score for all records of the dataset.

20. The system of claim 16, wherein the dataset comprises multiple data objects, wherein defining the at least one delta rule comprises defining multiple delta rules, each delta rule of the multiple delta rules being associated with a respective set of data objects of the dataset, and the method further comprising: performing the determining step for each delta rule of the multiple delta rules using the modified records of the set of data objects that are associated with the respective delta rule.

* * * * *